United States Patent [19]
Johnson et al.

[11] Patent Number: 4,830,343
[45] Date of Patent: May 16, 1989

[54] VIBRATION AND IMPACT ISOLATOR

[76] Inventors: William G. Johnson, R.R. #3, Caistor Centre, Ontario, Canada, L0R 1E0; Lerue C. Kleppinger, Jr., Rte. 1, Box 98, Walnutport, Pa. 18088

[21] Appl. No.: 108,520

[22] Filed: Oct. 15, 1987

[51] Int. Cl.⁴ .............................................. F16F 1/18
[52] U.S. Cl. ........................................ 267/44; 267/46; 267/139; 267/272
[58] Field of Search ............... 267/44, 45, 46, 164, 267/165, 180, 139, 167, 178, 36.1, 142

[56] References Cited

U.S. PATENT DOCUMENTS

| | | | |
|---|---|---|---|
| Re. 15,326 | 4/1922 | Hill | 267/44 |
| 297,974 | 5/1884 | Dorsey | 267/272 |
| 425,755 | 4/1890 | Cook | 267/44 |
| 530,649 | 12/1894 | Penn | 267/44 |
| 1,111,279 | 9/1914 | Syckel | 267/46 |
| 1,193,625 | 8/1916 | Sonderegger et al. | 267/46 |
| 1,240,929 | 9/1917 | Bissell | 267/46 |
| 1,560,200 | 11/1925 | Bernhardt | 267/46 |
| 1,601,172 | 9/1926 | Harris | 267/46 |
| 1,982,706 | 12/1934 | Teetor | 267/164 X |
| 2,607,395 | 8/1952 | Petrillo | 267/165 X |
| 2,831,723 | 4/1958 | Adell | 49/462 |
| 3,105,323 | 10/1963 | Esler et al. | 428/121 |
| 3,494,075 | 2/1970 | Kunevicius | 49/462 |
| 3,513,595 | 5/1970 | Mills | 49/462 |
| 3,523,710 | 8/1970 | Barecki et al. | 297/456 |
| 3,618,144 | 11/1971 | Frey et al. | 267/142 |
| 4,003,180 | 1/1977 | Messuri | 52/716 |
| 4,042,741 | 8/1977 | Bright | 428/217 |
| 4,344,253 | 8/1982 | Stiles | 49/383 |
| 4,604,832 | 8/1986 | Adell | 49/462 |

Primary Examiner—Andres Kashnikow
Assistant Examiner—Matthew C. Graham
Attorney, Agent, or Firm—Michael F. Petock

[57] ABSTRACT

A vibration or impact isolator for use between bodies and/or structures, such as between a boat and a dock, is formed from a resilient elongated strip of resiliently flexible material of uniform lateral cross-section wherein longitudinal lateral portions of the strip are formed in the shape of open involutes extending through at least 270 degrees in the unbiased or undeformed condition. An intermediate portion or central portion of the strip between the two lateral edges, which connects the involutes, is deformable on mounting of the longitudinal strip to one of the bodies. Such mounting deforms the strip from an initial condition in which it holds the involutes spaced apart from one another to permit access to said intermediate portion between the involutes and a mounted condition in which it biases the involutes into mutual contact to enclose the free ends of the longitudinal edges to provide an extended resilient external surface of the element for contact with a second body, such as a boat when the strip is mounted on a dock.

21 Claims, 6 Drawing Sheets

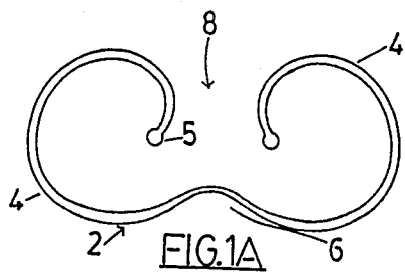 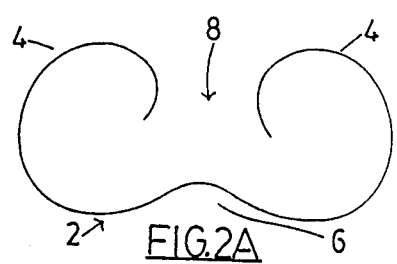
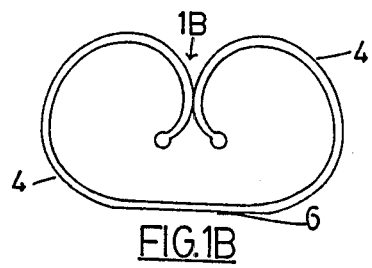 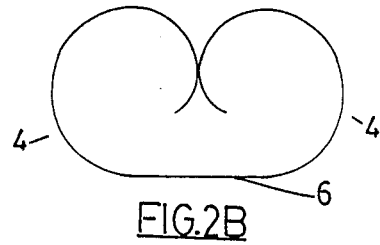
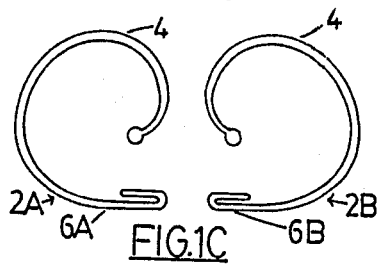 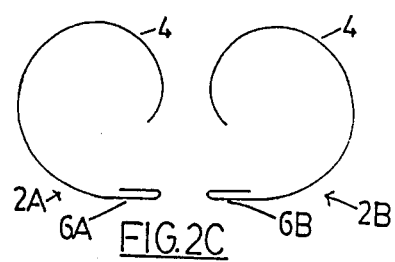
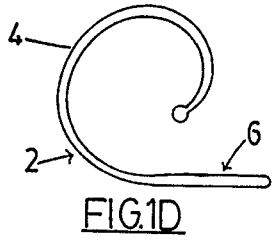 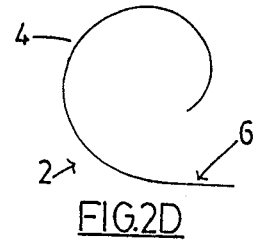

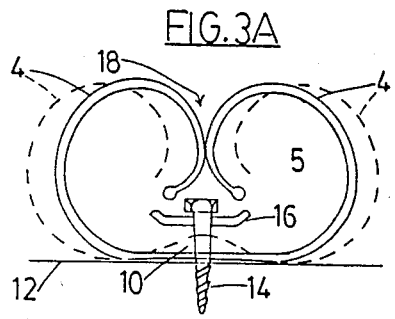
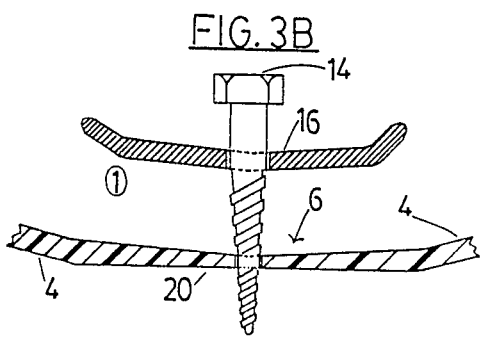
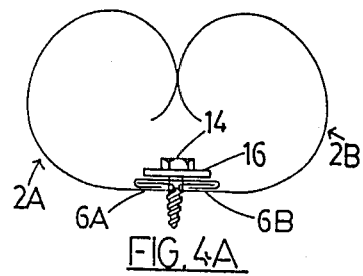
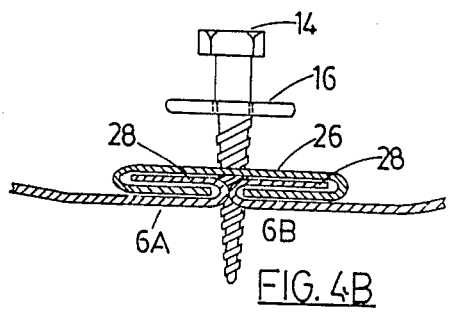
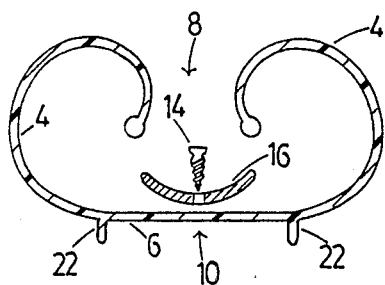
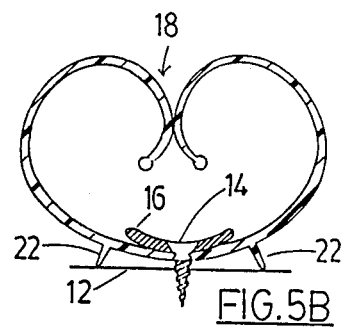
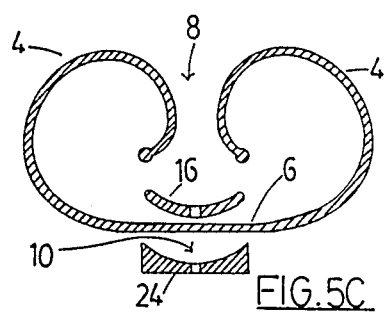

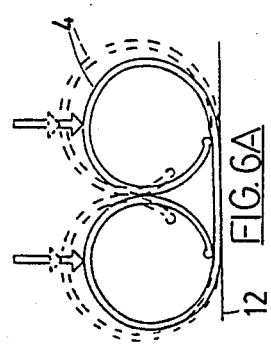
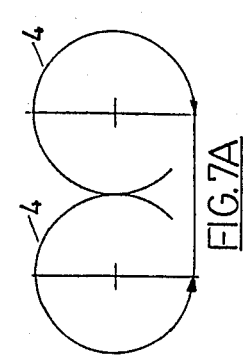
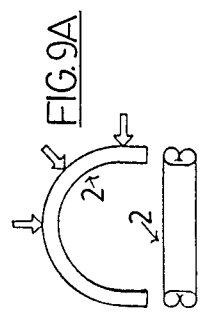
FIG.6D  FIG.7D  FIG.9A / FIG.9B
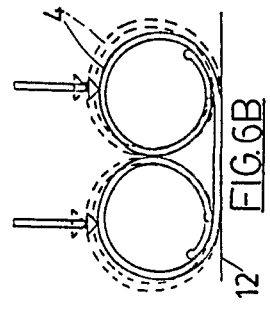
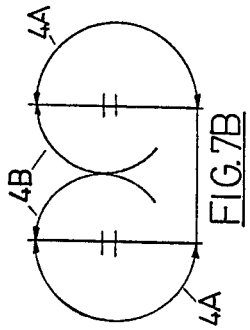
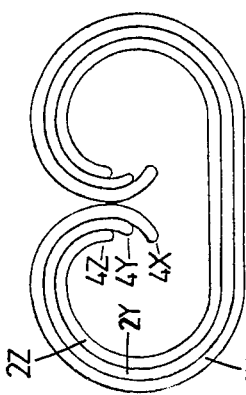
FIG.6C  FIG.7C  FIG.8B
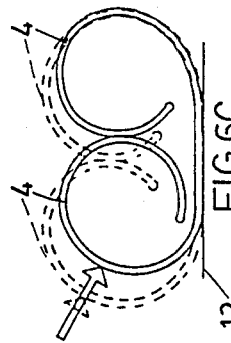
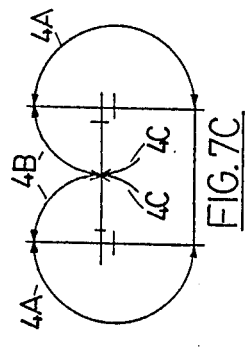
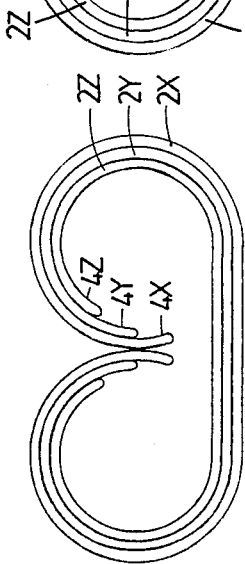
FIG.6B  FIG.7B  FIG.8A
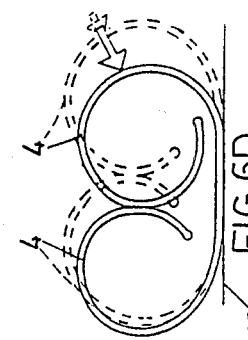
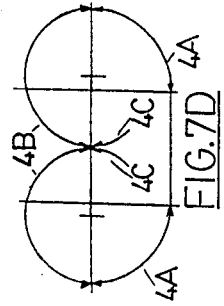
FIG.6A  FIG.7A

VIBRATION AND IMPACT ISOLATOR

FIELD OF THE INVENTION

This invention relates to vibration or impact isolators for use in a variety of applications in which resilient elements are required for interposition between bodies or structures having at least a degree of independent motion.

BACKGROUND OF THE INVENTION

The types of impact isolator to which the present invention is most particularly directed to those known collectively as fenders. Typical examples of fenders are those applied to boat docks to shield boats from damage caused by impact with the dock structure, to the exterior of vehicles to protect them from impact with other vehicles or fixed structures, and the interior of freight vehicles to avoid cargo damage by impact with walls of the vehicle, either during loading and unloading or during transit. Vibration isolators are normally inserted more or less permanently between two structures so as to reduce the transmission of vibration from one structure to another. Such isolation may be utilized in mountings for machinery, in sprung platforms or floors of various kinds, and in the suspension systems of vehicles.

Numerous forms of resilient fenders and bumpers are known, a wide range of products intended for this purpose being advertised in marine catalogues. Most are suitable only for a limited range of applications, and require a significant investment to provide adequate protection. In general, the effectiveness of such products is dependent upon the direction of impacts to which they are subjected. Similarly, a wide range of resilient bump strips of various forms are applied to vehicles. In some specialized applications, such as fairground bumper cars, costly inflatable pneumatic fenders have been needed to meet safety requirements.

SUMMARY OF THE INVENTION

An objective of the present invention is to provide a vibration and impact isolator element capable of progressive responsive to vibratory and impact forces from a wide range of directions, which can be cheaply and easily manufactured from a range of materials, which can be easily installed in a wide variety of situations, and which is neat in appearance.

According to the invention, a vibration or impact isolator for interposition between two bodies or structures comprises a continuous cross-sectionally involuted strip of resiliently flexible material, at least one edge portion of the strip in an undeformed condition forming an open involute extending through at least about 270°, and a portion of the cross section of the strip remote from involuted portions thereof being adapted for securement in abutment with one of said bodies or structures so as to present radially outward surfaces of said involuted portions to the second of said bodies of structures. Preferably the strip is bilaterally involuted, and most preferably the strip in its free condition is formed so that the bilateral involutions are separated from one another, the portion adapted for securement being deformable on securement to bring the involutions into contact with one another.

Impact or vibratory forces applied to the external surfaces of the involuted portion of the strip from any externally accessible direction will cause smoothly progressive deformation of the involute or involutes as the force is sustained.

Further features of the invention will become apparent from the following description of preferred embodiments with reference to the accompanying drawings.

SHORT DESCRIPTION OF THE DRAWINGS

FIGS. 1A, 1B, 1C and 1D show end views of lengths of impact or vibration isolator elements, in accordance with the invention and extruded from resilient synthetic plastic;

FIGS. 2A, 2B, 2C and 2D show end views of lengths of impact or vibration isolator elements in accordance with the invention and formed from resilient sheet metal;

FIG. 3A is an end view illustrating installation of the element of FIG. 1A;

FIG. 3B is an enlarged detail from FIG. 3A;

FIG. 4A illustrates installation of the element of FIG. 1C;

FIG. 4B is an enlarged detail from FIG. 4A;

FIGS. 5A, 5B and 5C are sections illustrating further embodiments of the invention;

FIGS. 6A-6D are figures illustrating how an installed element can respond to different magnitudes and directions of impact forces;

Figure 11A:
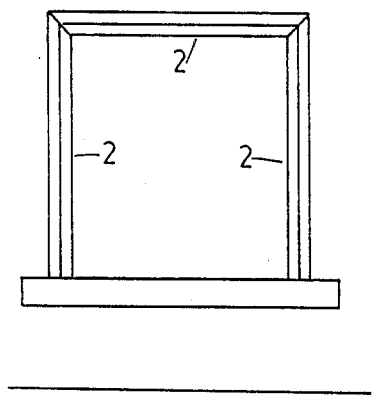
Figure 11B:
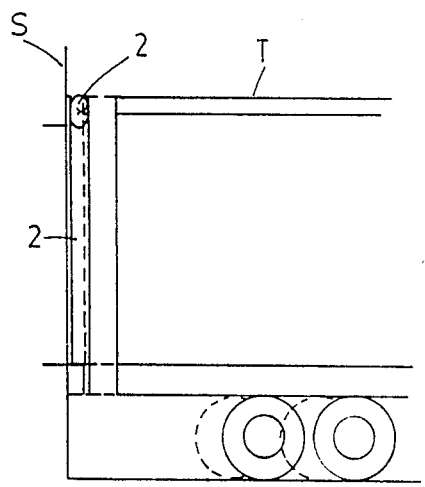
Figure 13:
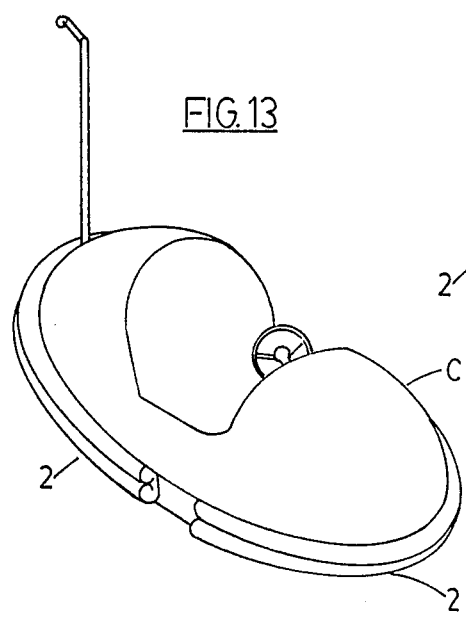
Figure 12:
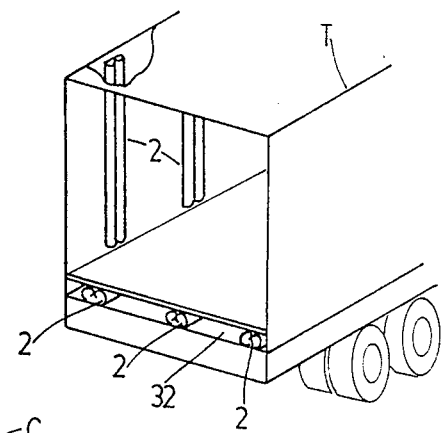
Figure 14:
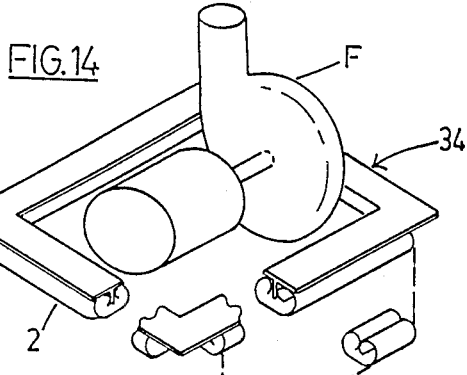
Figure 15:
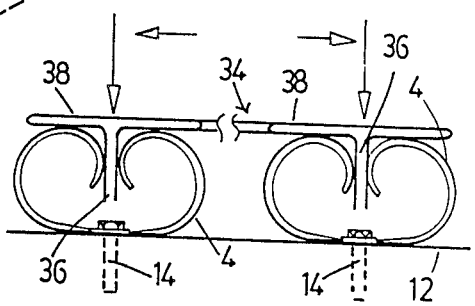
Figure 16:
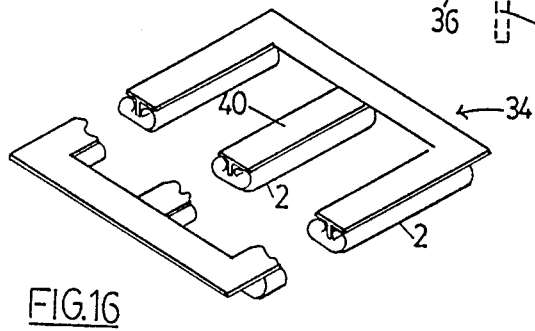
Figure 18:
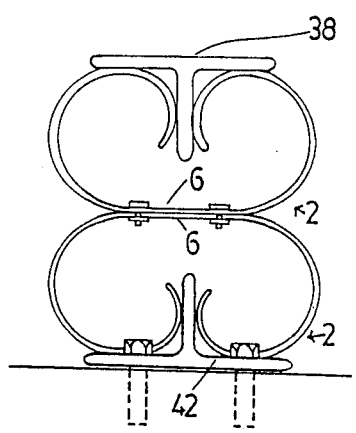
Figure 17:
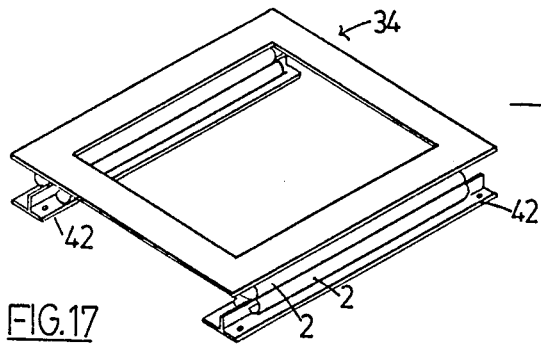

FIGS. 7A-7D diagrammatically illustrate different forms of involution of the edge portions of an element in accordance with the invention;

FIGS. 8A and 8B are end views of composite elements in accordance with the invention;

FIG. 9A and 9B are plan and elevational views illustrating that an isolator element can be longitudinally curved;

FIGS. 10A-10E are plan, elevational and detail plan and perspective views illustrating the application of elements in accordance with the invention to a boat dock;

FIGS. 11A and 11B illustrate the application of elements in accordance with the invention to a truck loading dock;

FIG. 12 is a perspective view illustrating two separate applications of elements in accordance with the invention within a truck body;

FIG. 13 illustrates the application of curved isolator elements to a bumper car;

FIG. 14 illustrates elements according to the invention incorporated in an anti-vibration mounting for a machine;

FIG. 15 is a vertical sectional details of portions of the mounting of FIG. 14;

FIG. 16 illustrates a variant of the mounting of FIG. 15;

FIGS. 17 and 18 are a perspective view and a vertical sectional detail of a further embodiment of mounting.

DESCRIPTION OF THE PREFERRED EMBODIMENTS

All of the embodiments described have in common the use of elements formed by elongated strips 2 of resilient material having an open involuted cross section in its free condition. In most cases, the strip is bilaterally involuted, having each longitudinal edge portion formed into an involute 4, although in some cases only one longitudinal edge portion is so formed (see FIGS. 1D and 2D). The involute need not be an involute in the strict geometrical sense, and approximations to the involute form are permissible, as shown in FIGS. 7A-7D, provided that the involute is open, i.e. different portions of the same involute curve do not touch each other when the portion of the strip forming the involute is not subject to deforming forces.

FIG. 7A shows a limiting case of involute curves, in which the radius of the involutes is constant. FIGS. 7G–7D illustrate how approximations to a true involute can be obtained by forming the involuted portions 4 with sections 4A, 4B and 4C of diminishing radii.

The involutes 4 in their undeformed condition will normally subtend an angle between 270° and 360°. An angle greater than 270° is required in order to obtain proper interaction of the bilateral involutes as the section is deformed, whilst an angle much greater than 360° will not in general provide any functional advantage which compensate for increased difficulties in manufacture.

Deformation of an element response to incident forces takes place in several phases, providing progressive response to such forces. Considering first an individual involute, the initial effect of the radial component of an incident radial force will be close the involute. Once the involute is closed, i.e., different portions of the same involute curve touch each other, a further increases in applied force will tend to tighten the involute curve, i.e. roll it up more tightly, whilst the contacting portions of the curve slide over each other thus providing a damping effect. Additionally, the involute itself will tend to deform and flatten, thus sustaining further forces. Assuming a localised application of the force, resultant deformations will extend longitudinally along the element, yet further distributing the applied load. According to the direction of incidence of the force, it may tend to unroll an outer portion of the involute, thus providing a further source of resistance, and the involutes of a bilaterally involuted element will coact against each other to provide yet a further source of resistance and damping.

In vibration isolation applications, described further below, the use of elements in accordance with the invention is advantageous, because in contrast to conventional coil springs, excellent control can be maintained over high frequency vibratory forces both in vertical and laterial directions. Furthermore lateral location can be achieved merely by arranging that the stem of an L or T section support member enters between the involutes of a bilaterally involuted element, lateral control in all directions being ensured merely by the provision of elements whose longitudinal axes extend in mutually perpendicular directions. These characteristics mean that vibration isolation can be provided without the necessity for the auxiliary lateral stabilization usually required with conventional isolators. Since forces can readily be distributed over a considerable length of vibration element, highly deformable materials can be used without loss of positional stability, and height requirements for such an isolator can be reduced as compared with conventional springs.

FIG. 1A shows the lateral profile of a preferred embodiment of fibration or impact isolator element in accordance with the invention. The element is of any required length and is preferably extruded from a synthetic plastic which under the intended conditions of operation of the element exhibits suitable properties of resiliency, impact resistance, dimensional stability and resistance to environmental factors such as moisture, contaminants and ultraviolet radiation (for outdoor applications), combined with acceptably low cost and extrudability. For many purposes, adequate performance can be obtained from available grades of vinyl polymers such as polyvinyl chloride including suitable known stabilizers, plasticizers and other conventional additives. Other suitable materials, according to application, include polyamides, with or without reinforcement, ionomer resins, with or without reinforcement, acetal and polycarbonate resins.

As in each embodiment of isolator element, the strip section includes bilateral involutes 4 and a portion 6 outward of, and in this case connecting the involutes, the intermediate section being associated with means for attaching the element to one of two objects or structures between which the element is to act. A typical means for attachment is shown in FIGS. 3A and 3B. The portion 6 is arched inwardly towards a gap 8 between the involutes 4 so as to present a concavity 18 towards a surface 12 on which the elements is mounted. By tightening down screws 14 on pressure means 16, which can either be individual washers, or preferably a continuous longitudinal strip, the concavity 10 is flattened, and the involutes 4 are caused to move inward from the positions shown in FIG. 1A and in broken lines in FIG. 3A to the positions shown in full lines in FIG. 3A in which the involutes 4 press against one another at point 18.

The edges of the strip at the inner extremities of the involutes 4 are preferably formed with a bead 5. The presence of this bead eliminates sharp edges and strengthens the edge of the strip and prevents local waves and irregularities which may prejudice the smooth operation of the device.

In order to minimize the risk of fatigue failure of the strip 2, the outer margins 18 of the elements 16 are relieved as best seen in FIG. 3B. Additionally, the thickness of the strip may be tapered in that portion 20 of the portion 6 which lies beneath the element or elements 16 so as to facilitate flattening of the portion 6 during mounting.

The curved initial configuration of the portion 6 has two major advantages over the configuration shown in FIG. 1B in which the portion 6 is flat, and the involutes must initially press against one another at point 18. Firstly, a section such as that shown in FIG. 1B is difficult or impossible to extrude directly so as to achieve both the desired pressure contact between the involutes, and to obtain involutes subtending an adequate angle relative to the mounting surface, and is difficult to handle during extrusion because of the lack of any portion of the strip which is accessible on both sides for engagement by means for hauling the extrusion from an extruding machine. Secondly, it is difficult to mount the element since the involutes must be forced apart to position the pressure element 16 and start any screws or other fastenings used to secure the element. The first of these problems may be overcome by initially extruding the strip 2 in the form shown in FIG. 1A, from thermoplastic material, and then locally reheating and flattening the portion 6 in a separate operation, but such an element will remain difficult to apply.

As best seen in FIG. 3A, the deformation of the element upon mounting increases the angle subtended by the involutes relative to the mounting surface, as well as closing the gap 8 between the involutes.

Various alternative means may be employed to provide a similar result to that shown in FIG. 3A. Rather than curving the section 6, the concavity 10 may be provided between longitudinal projections 22 extruded on the outer surface of each side of the portion 6, as shown in FIG. 5A, so that mounting of the element utilizing fastenings such as screws 14 and an element 16 produces the result shown in FIG. 5B with the involutes 4 pressed into contact at 18. The FIG. 3A embodiment is preferred for mounting on rough surfaces, since the smooth curves move more easily over such surfaces during mounting. Rather than forming the concavity 10 in the strip 2, it may be formed in a separate concave underlay strip 24 as seen in FIG. 5C.

FIGS. 2A and 2B show an insolator element functionally equivalent to those of FIGS. 1A and 1B, but formed from a metal strip utilizing conventional strip forming techniques. Typically the strip will be in an annealed state, and hardened during or after forming: the section of FIG. 2 may be formed by later heating the portion 6 of the section shown in FIG. 2A so as to soften it, and then flattening this portion. The metal of the strip should be a spring steel or other alloy providing high resilience and impact and fatigue resistance. Particularly for impact isolation applications, plastics will often be preferred to metal because of typically lower cost and weight, greater energy absorbency, and greater resistance to permanent deformation by impacts.

The element may be formed in two separate portions 2A and 2B as shown in FIGS. 1C and 2C, showing plastic and metal elements respectively. During mounting, portions 6A and 6B are connected and secured as shown in FIGS. 4A and 4B by a C-section connector member 26 engaging flanges 28 on the portions 6A and 6B and in turn secured by screws 14 and washers 16.

In some cases, an element formed from a unilaterally involuted strip as shown in FIGS. 1D and 2D may provide adequate performance. The version of FIG. 1D, extruded from plastic, has a thickened portion 6, which may be configured if desired to suit different forms of attachment means. Improved performance is however provided by the bilateral configurations described above, as is illustrated by FIGS. 6A–6D which illustrate the reaction of such a bilaterally involuted element to impact forces (designated by arrows) applied from different directions. Thus a vertical (refer to the orientation of the drawing) force produces a deformation of the involutes 4 from the position shown in broken lines to that shown in full lines. Further increase in the force further deforms the involutes from the position shown in full lines in FIG. 6A and broken lines in FIG. 6B, to the position shown in fully lines in FIG. 6B. FIGS. 6C and 6D similarly illustrate how the involutes interact to sustain lateral forces. Furthermore, a bilaterally symmetrical profile is easier to manufacture, particularly by extrusion since the distribution of material is symmetrical, cooling is symmetrical, traction may be applied centrally during extrusion, and it is much easier to provide a straight extrusion of the correct form since asymmetrical extrusions are prone to warping problems.

FIGS. 8A and 8B illustrate how elements 2X, 2Y and 2Z may be nested to enable greater forces to be sustained. In this case, the angular extent of each involute 4X, 4Y, 4Z may be progressively reduced, provided that the involutes 4X of the outermost elements extend through more than 270°.

FIG. 9A and 9B illustrate that the elements 2 may be curved longitudinally. This is most practicable with the embodiments extruded from plastic. Such curved elements can provide impact protection from a still greater range of directions, as illustrated by the arrows in FIG. 8A.

FIGS. 10–18 illustrate various applications of the elements described so far as impact and vibration isolators.

Figures 10A, 10B, 10C, 10D, 10E:
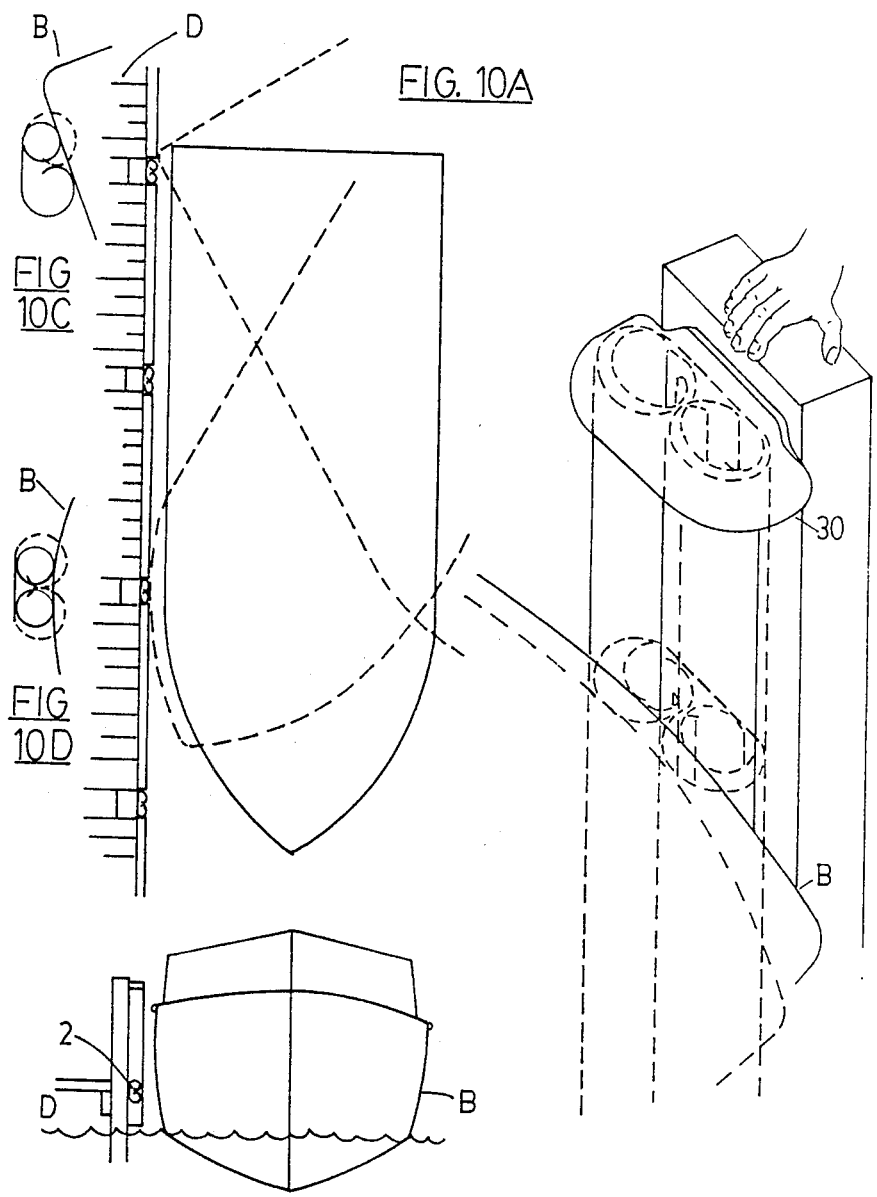

Referring to FIGS. 10A–10D, elements 2 in accordance with the invention are applied as fenders to the structure of a dock, having a deck D and uprights U, and accommodating a boat B. Elements 2 are applied vertically to the uprights U, having an extent sufficient to accommodate expected changes in water level and boat freeboard, and horizontally to the edges of the deck. FIGS. 10C and 10D illustrate how the elements 2 react to various forms of impact by the boat B.

FIG. 10E is a further perspective detail view of the installation of FIGS. 10A and 10B, firstly illustrating a cap 30 which may be secured to an upright U over the tops ends of vertical elements 2 so as to prevent persons putting their hands or fingers into the ends of the elements during docking. It also further illustrates the deformation of an element 2 in response to impact by the boat B.

FIG. 11A and 11B illustrate the application of elements 2 around the perimeter of a truck loading dock formed by an opening in a building structure S. The elements 2 not only protect both the structure S and a truck T from impact by the latter, but will also deform under pressure from the truck to provide a weather tight seal around the dock.

FIG. 12 illustrates how elements 2 in accordance with the invention may be employed within a truck T, or other freight carrier such as a trailer, container or railroad freight car. Element 2 may be applied to the inside walls of the truck to cushion articles or animals being loaded or transported. Similarly, a floor panel 32 may be supported on elements 2 to isolate cargo from vibration transmitted through the original floor F of the truck. Such an arrangement may be particularly valuable in protecting the legs of valuable livestock such as horses. A similar arrangement may be utilized in other applications where a sprung floor is required.

FIG. 13 shows curved elements 2 as shown in FIGS. 9A and 9B, applied as fenders to a bumper car C. Various jurisdictions have regulations as to the performance of fenders applied to such cars, which have been met hitherto by mostly pneumatic fenders designed and manufactured for the purpose.

FIGS. 14 and 15 illustrate the application of element 2 as vibration isolators for a machine, in this case a motor and blower unit F, supported in a perimeter frame 34 formed by T-section members. The elements 2 are secured to a supporting floor 12 by bolts 14, for example in the manner shown in FIGS. 3A or 4A, so that the stems 36 of the T-shaped members enter between the involutes 4 and the cross bars 38 of these members rest on the involutes.

This arrangement has the advantage over conventional vibration isolating elements in that it provides resistance to lateral displacement (illustrated by the horizontal arrows in FIG. 15) as well as vertical displacement illustrated by the vertical arrows in FIG. 14. No auxiliary means is therefore necessary to control horizontal displacement of the frame 34. Moreover, no mechanical fasteners are required to secure the elements 2 to the stems or crossbars of the frame members.

If necessary, additional cross members 40 associated with elements 2 may be provided on the frame 34 as shown in FIG. 16.

In order to provide for a greater range of vertical displacement, the portions 6 of two elements 2 may be connected back to back as shown in FIGS. 17 and 18, the lower elements 2 being located by further inverted T-shaped elements 42 mounted to the floor. Again, no mechanical fastenings to the elements 2 are required, and only the free ends of the elements 42 need be bolted to the floor.

Numerous other applications as impact and vibration isolators are possible. For example, elements 2 moulded from plastic may be attached as support feet beneath machines and appliances which generate vibration.

We claim:

1. A resilient isolator for interposition between two bodies comprising an elongated strip of resiliently flexible material and uniform lateral cross-section, opposite longitudinal edge portions of the strip, including free longitudinal edges of the strip, in an undeformed condition forming open involutes extending through at least 270°, and an intermediate portion of the cross-section of the strip between and connecting the involutes being deformable on mounting said intermediate portion of the strip to one of said bodies, between an initial condition in which it holds said involutes spaced from one another to permit access to said intermediate portion between the involutes and a mounted condition in which it biases said involutes into mutual contact to enclose said free longitudinal edges and provide an extended resilient external surface of the element for contact with a second of said bodies.

2. An isolator element according to claim 1, wherein said intermediate portion in its initial condition has a curvature opposite to that of said involutes.

3. An isolator element according to claim 1, wherein said intermediate portion has spaced ribs on its side facing outwardly from the involutes, and a mounting zone between said ribs.

4. An isolator element according to claim 1, including a concave mounting between said intermediate portion and a structure to which it is to be mounted, whereby to deform said portion on mounting of the strip.

5. An isolator element according to claim 1, wherein the strip is extruded from synthetic thermoplastic material.

6. An isolator element according to claim 1, wherein a continuous bead is extruded at opposite longitudinal edges of the strip.

7. An isolator element according to claim 1, wherein the strip is roll formed from metal strip.

8. An isolator element according to claim 1, in which the strip is curved in a plane perpendicular to said intermediate portion.

9. A resilient isolator element for interposition between two bodies comprising an elongated strip of resiliently flexible material and uniform lateral cross section, opposite edge portions of the strip in an undeformed condition forming open involutes extending through at least 270° to free longitudinal edges of the strip from an intermediate portion of the cross-section of the strip joining the involutes, and means mounting said intermediate portion to one of said bodies, with said involutes in mutual contact with both said one body and each other, and presenting an extended resilient external surface for contact with a second of said bodies.

10. An isolator element according to claim 9, comprising at least one further involuted strip nested inside the first strip to provide an isolator of greater strength.

11. An isolator element according to claim 9, wherein said involutes are approximated by circularly curved portions of the strip of successively reduced radii.

12. A resilient isolator for interposition between two bodies, comprising a longitudinally elongated strip of resiliently flexible material and uniform lateral cross-section, at least one edge portion of the strip in an undeformed condition forming an open involute extending through at least 270° so as substantially to enclose a free longitudinal edge of the strip, and a portion of the strip remote from the at least one involuted edge portion thereof having means for securement in abutment with one of said bodies so as to present radially outward surfaces of said at least one involuted portion to the second of said bodies.

13. An isolator comprising two elements according to claim 12, having adjacent portions secured in abutment with said one body, and oppositely handed involutes.

14. An isolator according to claim 13, comprising a clip which serves both to connect said abutting portions to one another and to clamp them to said one body.

15. A resilient isolator comprising a longitudinally elongated strip of resiliently flexible material and uniform cross-section, opposite edge portions of the strip forming open involutes extending through at least 270°, and an intermediate portion of the strip being mounted to a plane surface of a body to be isolated from another body impingent on external surfaces of the involutes, said intermediate portion of the strip generating a bias of said involutes towards resilient contact with each other with free longitudinal edges of the strip substantially enclosed within the involutes.

16. An isolator according to claim 15, including mounting means in deforming engagement with said intermediate portion to generate said bias of said involutes.

17. An isolator according to claim 15, wherein the first body is a dock.

18. An isolator according to claim 15, wherein the first body is a vehicle.

19. An isolator according to claim 15, wherein the first body is a one of a floor and a platform supported above the floor, and the other body is the other of the floor and the platform.

20. An isolator according to claim 19, wherein the platform supports a machine.

21. An isolator according to claim 19, wherein the other body comprises T-section members, the cross bar of the T-section engaging the involutes, and the stem of the T-section entering between the involutes.

* * * * *

UNITED STATES PATENT AND TRADEMARK OFFICE
CERTIFICATE OF CORRECTION

PATENT NO. : 4,830,343
DATED : May 16, 1989
INVENTOR(S) : William G. Johnson & Lerue C. Kleppinger, Jr.

It is certified that error appears in the above-identified patent and that said Letters Patent is hereby corrected as shown below:

Column 3, line 7, delete "7G" and insert --7B--.

Column 3, line 22, after "will be", insert --to--.

Column 3, line 25, delete "increases" and insert --increase--.

Column 3, line 60, delete "fibration" and insert --vibration--.

Column 4, line 18, delete "elements" and insert --element--.

Column 5, line 11, delete "insolator" and insert --isolator--.

Column 6, line 18, delete "tops" and insert --top--.

Column 6, line 46, delete "mostly" and insert --costly--.

Signed and Sealed this

Twenty-fourth Day of October, 1989

Attest:

DONALD J. QUIGG

Attesting Officer     Commissioner of Patents and Trademarks